(12) United States Patent
Gyenge et al.

(10) Patent No.: US 7,060,391 B2
(45) Date of Patent: Jun. 13, 2006

(54) CURRENT COLLECTOR STRUCTURE AND METHODS TO IMPROVE THE PERFORMANCE OF A LEAD-ACID BATTERY

(75) Inventors: Elod Gyenge, Vancouver (CA); Joey Jung, Delta (CA); Alvin A. Snaper, Las Vegas, NV (US)

(73) Assignee: Power Technology, Inc., Houston, TX (US)

( * ) Notice: Subject to any disclaimer, the term of this patent is extended or adjusted under 35 U.S.C. 154(b) by 0 days.

(21) Appl. No.: 10/809,791

(22) Filed: Mar. 26, 2004

(65) Prior Publication Data

US 2005/0100791 A1    May 12, 2005

Related U.S. Application Data

(63) Continuation of application No. PCT/US02/30607, filed on Sep. 25, 2002.
(60) Provisional application No. 60/325,391, filed on Sep. 26, 2001.

(51) Int. Cl.
*H01M 4/66* (2006.01)

(52) U.S. Cl. .............. 429/245; 429/236; 429/233; 429/234; 429/241; 429/227; 429/228; 429/225; 29/2

(58) Field of Classification Search ............. 429/236, 429/245, 226, 228, 233, 234, 241, 227, 225; 29/2
See application file for complete search history.

(56) References Cited

FOREIGN PATENT DOCUMENTS

| ES | 2 110 365 | * | 2/1998 |
| JP | 5-74464 | * | 3/1993 |

* cited by examiner

*Primary Examiner*—Laura Weiner
(74) *Attorney, Agent, or Firm*—McNeely Intellectual Property Law; Kevin J. McNeely

(57) ABSTRACT

A battery, a battery electrode structure, and methods to make the same. The product and method comprise applying a layer of lead-tin containing alloy to substrates for anodes or cathodes for lead-acid batteries, in which the substrates are porous or reticulated.

15 Claims, 4 Drawing Sheets

CURRENT COLLECTOR STRUCTURE AND METHODS TO IMPROVE THE PERFORMANCE OF A LEAD-ACID BATTERY

PRIORITY OF CONTINUING APPLICATION

This application is a continuation of co-pending application PCT/US02/30607 and claims priority to U.S. Provisional Patent Application 60/325,391 filed on Sep. 26, 2001.

FIELD OF THE INVENTION

This invention relates generally to lead-acid battery electrodes and particularly to high surface area electrodes which improve the performance of lead-acid batteries in one or more ways alone or in combination such as: specific discharge capacity, positive active mass utilization, and discharge/recharge cyclability.

BACKGROUND OF THE INVENTION

The lead-acid battery in its various configurations is a time-honoured power source for diverse applications such as starting-lighting-ignition (SLI), uninterrupted power supply (UPS) and motive power. Continuous developments on the application side, for instance in the area of electric vehicles and hybrid electric vehicles (EV and HEV), impose challenging performance demands on battery technologies in general and lead acid batteries in particular. Pavlov summarized the relationship between battery specific energy in watt hours/kilogram (Wh/kg) and number of battery discharge/charge cycles for both flooded and valve-regulated type lead acid batteries. For both battery types, the higher the battery specific energy the lower the number of discharge/charge cycles and hence, the battery cycle life. Typically, a flooded battery with a specific energy of 40 Wh/kg can be used for about 500 discharge/charge cycles, while a battery producing only 30 Wh/kg can be employed for about 850 cycles. Thus, there is clearly a need to improve both the specific energy and cycle life of lead-acid batteries in order to make them more suitable for electric traction applications.

It is well known that the low utilization efficiency of the active mass, especially on the positive electrode, in conjunction with the heavy weight of the lead current collectors, limits the actual specific energy of the lead-acid battery. The structure of the current collector plays an important role in determining the utilization efficiency of the positive active mass (PAM). During discharge, on the positive electrode, the structure of the current collector must allow for significant volume increase (e.g. molar ratio of $PbSO_4$ to $PbO_2$ is 1.88) while maintaining electrical contact with the active material and assuring ionic transport to the electroactive sites.

There are many examples in the prior art describing techniques to increase the specific energy output by improving the porosity and specific surface area of the lead compound based paste (active material) applied onto the battery current collector (or grid). For example, Stoilov et al in U.S. Pat. No. 5,332,634 states that "there is a need for making lead electrodes with a porous active mass, which has a large active surface area and which strengthens the electrical connection between the active mass and the grid. Such a porous lead electrode would lead to electrochemical cells and accumulators which produce more power per unit of weight and also present very low electrical resistance."

Regarding improvements in the battery current collector structure, Czerwiński and Zelazowska have described the electrochemical behaviour of lead deposited on a non-metallic open pore substrate, namely reticulated vitreous carbon (RVC). These authors prepared small, 1 $cm^2$ geometric area, collectors by electrodeposition for 10 minutes of Pb from an alkaline solution containing 20 g/l NaOH to produce the negative electrode and anodic oxidation to form lead dioxide ($PbO_2$) on the positive electrode using a concentrated lead nitrate based solution ($Pb(NO_3)_2$). The amount of generated active material, Pb and $PbO_2$, was small at about 19.3 mg and 22.3 mg, respectively. Consequently, if a battery had been assembled with the above described electrodes, the corresponding capacity would have been extremely low, in the range of 4.5 mAh, insufficient for practical use. Furthermore, the battery structure described by Czerwiński and Zelazowska is not rechargeable in sulfuric acid, which is the operational electrolyte of lead-acid batteries, since the recommended active material generation procedure required alkaline and nitrate based electrolyte. Therefore, this prior art proposes a technique to manufacture a lead-acid battery with a cycle life of one (i.e. one time use). Clearly, it was not envisaged to paste active materials onto the reticulated substrate in order to create a high capacity, rechargeable battery.

Das and Mondal suggested developing lead acid current collectors with thin layers of active materials deposited on lightweight, electronically conducting substrates, such as a carbon rod. The rationale was only to reduce the 'dead weight' of the lead acid system, which would somewhat increase the specific energy.

Snaper, in U.S. Pat. No. 6,060,198 describes the use of reticulated metal structures for use as current collectors in batteries in which the reticulated structure consists of a plurality of pentagonally faced dodecahedrons. This prior art does not teach methods for using such a structure to improve the cycle life and performance of a lead acid battery and does not envisage the use of non-metallic electrically conductive substrates such as reticulated carbon to reduce battery weight. None of the above mentioned prior art references regarding reticulated structure suggest any need for combining the reticulated structure with a lead containing paste to create a rechargeable battery suitable for use in multiple charge/discharge cycles.

SUMMARY OF THE INVENTION

The present invention relates to methods of improving the performance, especially cycling performance, of lead-acid batteries by using current collector structures based on light-weight, porous, open pore, high specific surface area (e.g. >500 $m^2/m^3$) substrates coated with a lead-tin alloy. More specifically it relates to the use of lead-tin alloys deposited on lightweight, open pore substrates such as carbon or aluminum to dramatically enhance the cyclability of the subsequent high surface area electrode for use as an anode and/or cathode in lead acid batteries while achieving all of the prior art mentioned advantages of high surface area porous electrodes, for example reticulated electrodes.

The present invention provides an improved current collector structure for generating power in a lead-acid battery. The current collector is comprised of a reticulated, light-weight, electronically conductive three-dimensional substrate matrix characterized by high specific surface area (i.e., between $5 \times 10^2$ and $2 \times 10^4$ $m^2/m^3$) and void fraction (i.e. between 70 and 98%). A number of materials could serve as the above-mentioned substrate such reticulated vitreous carbon, aluminum, copper and organic conductors, either alone or in combination.

Furthermore, an integral part of the structure consists of a layer of lead-tin deposited throughout the surface and depth of the three-dimensional reticulated matrix to cover as uniformly as possible all the ligaments of the substrate matrix. The thickness of the deposited lead-alloy layer can range for example between 20 to 2000 μm, depending on the intended application and battery cycle life. The resulting composite structure composed of the light-weight matrix covered by a layer of lead-alloy, is used as the positive and/or negative current collector in lead-acid batteries. It is understood for those skilled in the art that in order to obtain a functional lead-acid battery the above-described collectors might be subjected to pasting with any variety of lead oxide and/or lead sulfate based pastes. The electrode formed by pasting the current collector is brought into contact with sulfuric acid of desired concentration and assembled in any type of flooded or valve-regulated lead-acid batteries. After forming (initial charging) the paste is converted into the active material (or active mass) which is lead dioxide on the positive electrode and lead on the negative electrode, respectively. When the lead-acid battery is subjected to discharge both the lead dioxide on the positive electrode and lead on the negative electrode are converted to lead sulfate and current is transferred via the current collector (or grid) to a consumption source (load). During charge, dc current is supplied to lead sulfate by the current collector and the active materials are regenerated. Thus, the interaction of current collector with the active mass is of crucial importance for the functioning of the lead-acid battery.

The present invention also provides methods for producing the high-performance current collectors, which includes the steps of lead or lead-alloy deposition and attachment of lugs, tabs and frames to the three-dimensional substrate.

DESCRIPTION OF THE PREFERRED EMBODIMENTS

Figure 1A:
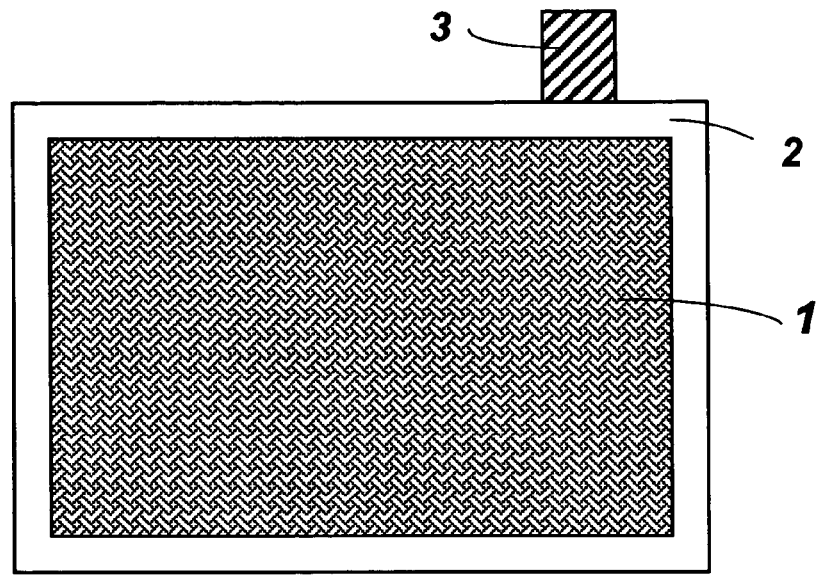
FIG. 1A is a front view schematic of the current collector according to one embodiment of this invention.

FIG. 1 represents a front view of the current collector structure according to one embodiment of the present invention. Denoted by reference numeral 1 is the high specific surface area part manufactured by depositing lead or lead-alloys on an electrically conductive, reticulated substrate such as but not limited to reticulated vitreous carbon. The high specific surface area part is attached to a frame 2, which in turn is connected to lug 3. Both the frame and lug are made of lead or a lead-alloy.

Figure 1B:
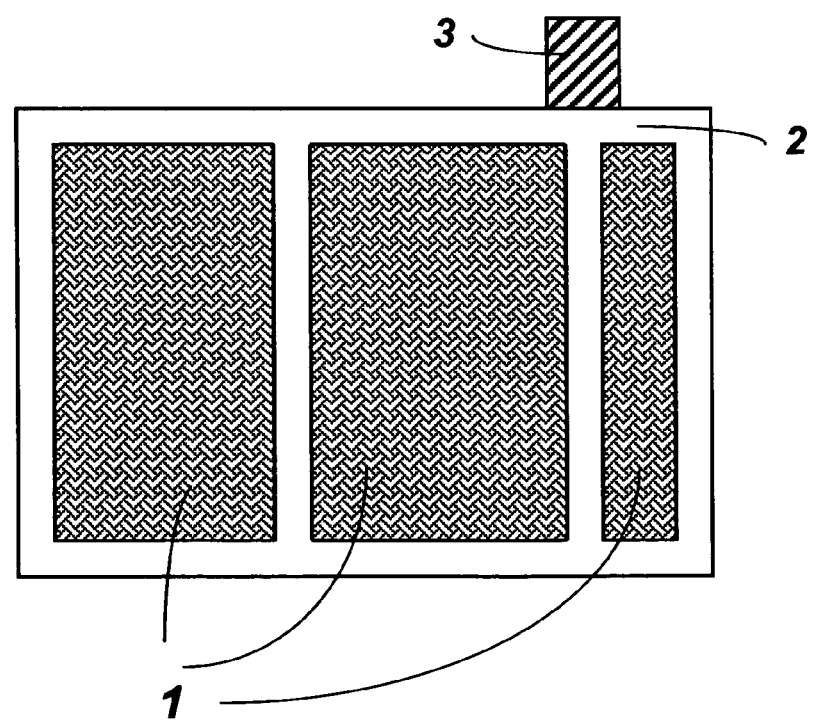
FIG. 1B is a front view schematic of the current collector according to another embodiment of this invention.

In another embodiment, shown by FIG. 1B, the lead or lead-tin alloy deposited reticulated part 1 is compartmentalized by intercalated stripes which are part of the overall frame structure 2. The compartmentalization improves the current and potential distribution characteristics across the high specific surface area component of the current collector structure, especially in case of larger plate designs.

Figure 1C:
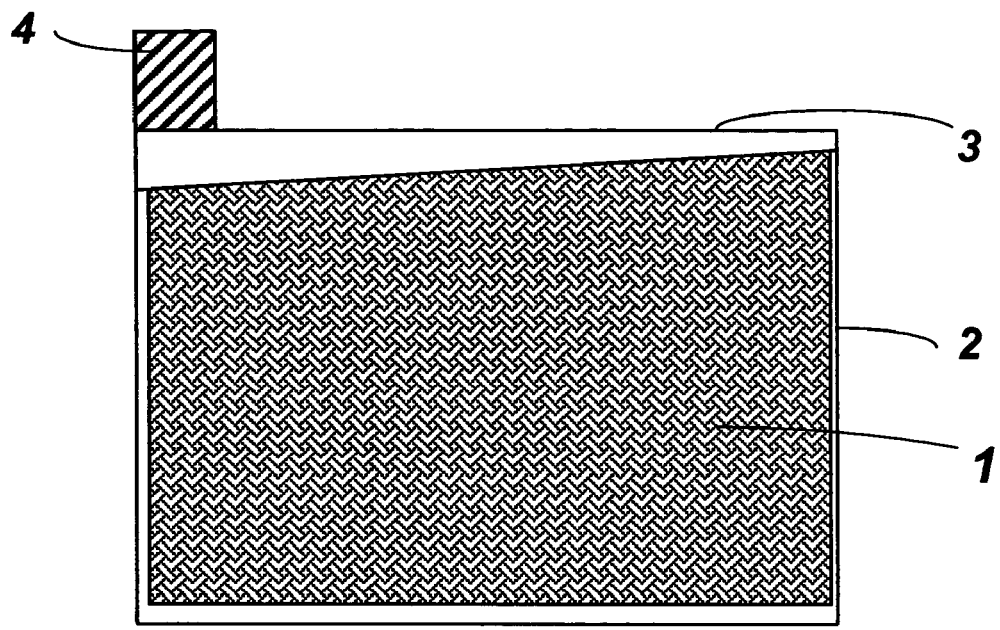
FIG. 1C is a front view schematic of the current collector according to an alternative embodiment of the present invention.

A further design variation is presented by FIG. 1C. In this case the top connector 3 has a triangular design, gradually widening toward the edge of the collector, where lug 4 is situated. This design feature combines the need for weight reduction of the connector with good corrosion resistance in the area of highest current concentration, i.e. current entry and exit zone 4. The frame 2 around the reticulated structure can be of similar or different width. One might use a wider frame on the side that is in contact with the lug and a thinner one on the opposite side (FIG. 1C).

Figure 2:
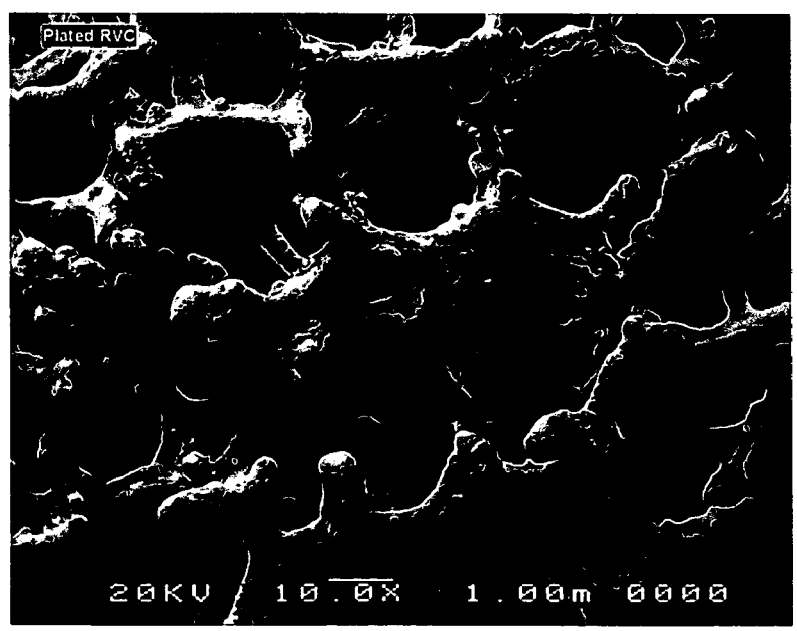
FIG. 2 is a scanning electron microscopy image of the high-specific surface area, reticulated part of the current collector structure according to one embodiment of this invention.

A scanning electron microscopy image of the reticulated part of the collector is shown by FIG. 2. In this particular case reticulated vitreous carbon with 30 pores per inch (ppi) (ERG Materials and Aerospace Corporation, Oakland, Calif., USA) served as substrate and it was plated with a lead alloy to give a functional collector for lead-acid batteries. FIG. 2 shows the interconnected, open-cell network, which forms the physical basis for current transfer to and from the active mass. The latter covers the surface of the wires and also occupies the openings of the reticulated structure. The proximity of the current collector wires to the active mass (e.g. diameter of the openings about 2 mm for the case depicted by FIG. 2) leads to enhancement of the active mass utilization efficiency and charge acceptance. The invention is further described by the following examples.

EXAMPLE 1

Manufacturing of the Reticulated Current Collector

In one embodiment of the present invention, reticulated vitreous carbon (RVC) slabs with 20 and 30 pores per inch (about 8 and 12 pores per centimeter, respectively) were used as substrates for grid manufacturing. The RVC slab having dimensions of: 15.2 cm×15.2 cm×12.8 mm (height× width×thickness) was sliced to a preferred thickness of about 3.5 mm, using a steel cutter. After slicing, the height and width of the carbon slab was adjusted to the size needed for the particular battery. One of the commonly employed current collector sizes is 12.7 cm×12.7 cm (height×width).

Following size adjustment, the vitreous carbon substrate was uniformly coated with a layer of lead-tin alloy. A variety of methods can be used for the deposition of lead-tin alloys on carbon based substrates, such as electroplating and vacuum deposition. In the present invention electroplating (or electrodeposition) was chosen to apply the lead-alloy coating on the RVC substrate. However, it is understood to those skilled in the art that other methods might be used to coat RVC with lead-tin alloy.

In the case of the electroplating method, in order to supply current to the vitreous carbon structure during electroplating, a 2.5 mm thick connector and 6 cm×1.3 cm (height× width) lug, both made of 99.8% by weight purity lead, were attached to the reticulated vitreous carbon slab. This was accomplished by immersing the top part of the carbon piece in melted lead at 370° C. using aluminum molds, followed by rapid cooling by an air-jet.

To electroplate lead on reticulated vitreous carbon, there are several lead electroplating bath compositions, such as fluoborate, sulfamate, and fluosilicate. In the present example the fluoborate bath was used. However, it is understood to those skilled in the art that other electroplating bath formulations could be considered. For the electroplating of a pure lead coating on the RVC substrate the fluoborate bath per one liter of stock solution was composed of: 500 ml of 50% by weight lead tetrafluoroborate ($Pb(BF_4)_2$), 410 ml of deionized water, 27 g of boric acid ($H_3BO_3$), 90 ml of fluoboric acid ($HBF_4$), and 3 g of peptone. During preparation the plating solution was thoroughly mixed at room temperature.

To electroplate a lead-tin alloy on the RVC substrate, the lead electroplating bath composition described above, was modified by the addition of various concentrations of tin tetrafluoroborate. The concentration of tin in the plating bath determines to large extent the tin content of the lead alloy. The typically employed lead-tin alloy electroplating solutions had the following composition per one liter of stock solution: between 74 and 120 ml of 50% by weight tin tetrafluoroborate ($Sn(BF_4)_2$) solution, 510 ml of 50% by weight lead tetrafluoroborate ($Pb(BF_4)_2$) solution, between 330 and 376 ml of deionized water, 27 g of boric acid ($H_3BO_3$), 40 ml of fluoboric acid ($HBF_4$), and 1 g of gelatin. During electroplating the tin content of the plating bath was kept constant either by using a sacrificial lead-tin anode or by adding at certain time intervals, fresh tin tetrafluoroborate solution.

Figure 3:
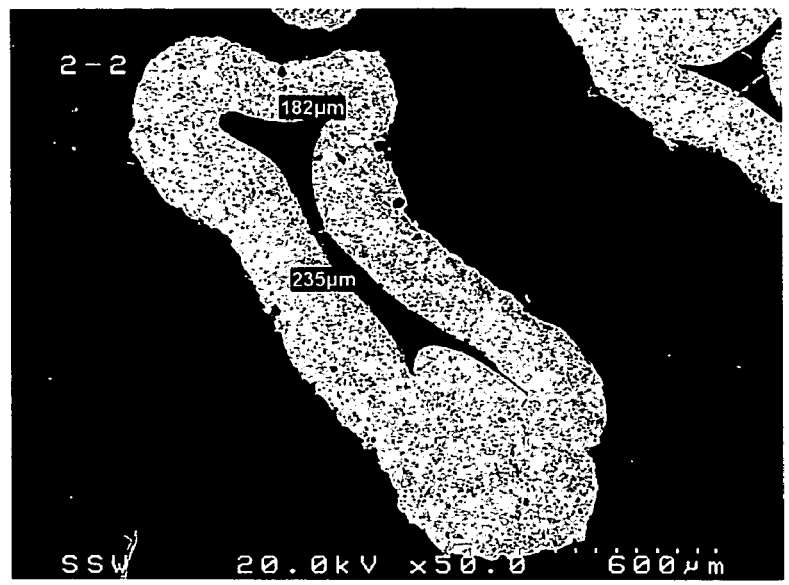
FIG. 3 shows a cross-sectional view, obtained by backscattered electron microscopy of the current collector structure according to the present invention.

The RVC plate was placed in the electroplating bath and acted as the cathode, whilst two 80/20 (by weight of lead to tin) lead-tin plates of 3.2 mm thickness (Metal Distributors Inc., Vancouver, BC, Canada) acted as sacrificial anodes sandwiching the RVC cathode. The distance between the RVC cathode and the lead-tin anode was 3.8 cm. The cathode and anode had similar geometric areas. Following immersion in the electroplating bath, the electrodes were connected to a DC power supply characterized by a maximum voltage and current output of 25 V and 100 A, respectively. The typical electroplating conditions for either lead or lead-tin electroplating on RVC were as follows: current density 570 A/m$^2$, cell voltage 0.3–0.7 V, temperature 20–25° C. The coating thickness was adjusted by varying the plating time (typically between 1 and 2 hours). The required lead or lead alloy coating thickness is a function of the intended battery type, application and electrode polarity. For the flooded lead acid battery the negative collector was produced with a 30–50 μm thick coating while the coating on the positive collector had a thickness of 200–500 μm. By employing different coating thickness on the negative and positive electrodes, both the weight saving and long cycle life objectives can be simultaneously achieved. FIG. 3 shows the back scattered electron microscopy image of the cross section for the plated reticulated vitreous carbon. The plated reticulated vitreous carbon has a lead-tin coating of 235 μm thickness, i.e. the positive collector.

After the electroplating was completed, the plated RVC was subjected to a sequential washing procedure in the following order: distilled water rinse, alkaline wash (0.1 M NaOH), distilled water wash, acetone wash and acetone dipping. Drying in a nitrogen atmosphere followed the last washing step. The described procedure assured complete removal of the electroplating bath components from the high surface area collector while minimizing the surface oxidation. In the case of lead alloy deposition the typical tin content of the collectors was between 0.5–2% by weight tin. It is understood to those skilled in the art that other coating tin contents can be easily achieved by adjusting the plating time, current density and/or plating bath composition.

Following the electroplating, washing and drying steps the current collector was further processed by replacing the tab and lug, which served as current feeder during electroplating, with a wider top connecting element that in one embodiment of the present invention had a triangular shape as shown by FIG. 1C. Additionally, three frames were also attached on the sides of the electroplated RVC plate. The process of attaching the new connector and frames was identical to the one described before for attaching the electroplating connector. The material for the battery grid tab and frames was a lead alloy containing 2% by weight of tin.

EXAMPLE 2

Effect of Coating Composition on the Battery Cycling Performance

In order to compare the performance of the pure lead and lead-tin alloy reticulated collectors, two flooded, single cell, 2 V, batteries were assembled, equipped with pasted plates using pure lead and lead-tin (1% by weight of tin) coated collectors, respectively. The pure lead and lead-tin coated collectors were manufactured according to the procedure described in Example 1. The following table summarizes the plating recipes and plating conditions.

TABLE 1

| | Electroplating conditions. | | | |
|---|---|---|---|---|
| | Lead Coated Positive | Lead Coated Negative | Lead-Tin Coated Positive | Lead-Tin Coated Negative |
| Recipe per one liter of electrolyte | 500 ml of 50% by weight $Pb(BF_4)_2$; 410 ml of deionized water, 27 g of $H_3BO_3$, 90 ml of $HBF_4$, and 3 g of peptone | | 74 ml of 50% by weight $Sn(BF_4)_2$, 510 ml of 50% by weight $Pb(BF_4)_2$; 376 ml of deionized water, 27 g of $H_3BO_3$, 40 ml of $HBF_4$, and 1 g of gelatin | |
| Current Density (A/m$^2$) | 570 | 570 | 570 | 570 |
| Plating Temperature (° C.) | 25 | 25 | 25 | 25 |
| Plating Time (Hr) | 2.5 | 1 | 2.5 | 1 |
| Coating Thickness (μm) | ~235 | ~95 | ~235 | ~75 |
| Size (cm × cm × mm) | 12.7 × 12.7 × 3.5 | | 12.7 × 12.7 × 3.5 | |

Each battery was composed of two negative and one positive reticulated collector pasted with an industry standard lead-acid battery paste obtained directly from a battery manufacturer and composed of lead sulfate, lead monoxides and lead dioxide. Two single-cell batteries were assembled using the respective battery plates (i.e. cured pasted collectors). First the battery plates were formed in dilute sulfuric acid (specific gravity 1.05) by applying a constant constant current charge in order to supply a charge of 520 Ah/kg$_{dry\ paste}$ in 72 hours. The forming step is necessary to create the active materials on the plates, i.e. Pb on the negative and PbO$_2$ on the positive.

Figure 4:
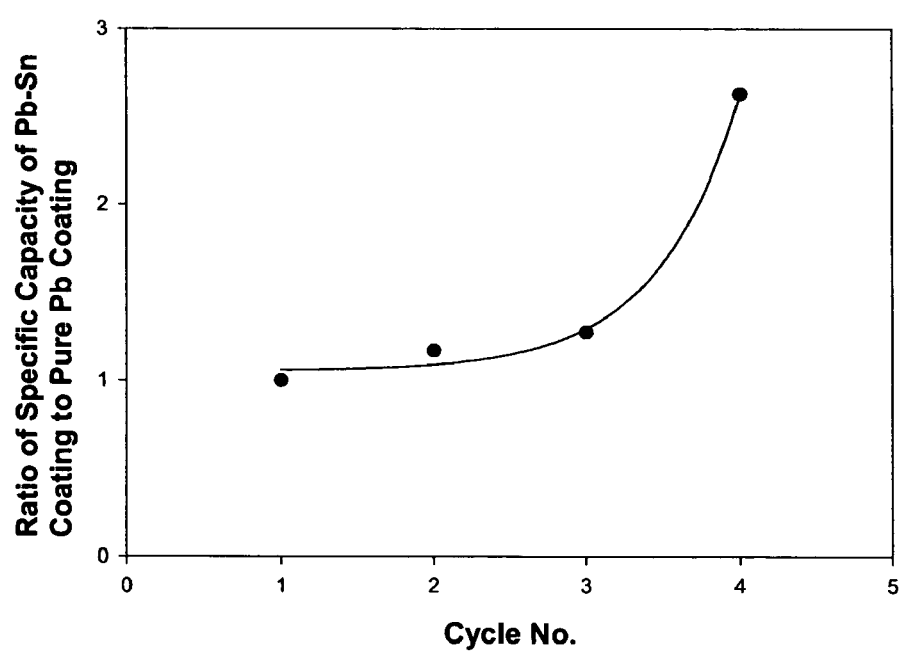
FIG. 4 compares the early stage cycling performance of pure lead and lead-tin (99:1 weight ratio of lead to tin) coated current collectors manufactured according to the present invention.

The testing protocol was comprised of consecutive daily cycles at 5 hour discharge rate with cut-off voltage at 1.5 V followed by 19 hour recharge at a float voltage of 2.35 V/cell using sulfuric acid with an initial specific gravity of 1.26. The above protocol is relevant for deep cycling of stand-by batteries and it is considered an extreme level of cycling for the latter battery type. FIG. 4 shows the comparison cycling characteristics of the two batteries. After first 4 days of cycling, the specific capacity of the pure lead plated RVC battery dropped, i.e. the specific capacity of lead-tin alloy electroplated RVC battery was 2.6 times higher of the specific capacity of pure lead plated RVC battery.

The results presented in FIG. 4 underline the beneficial effect of tin as an alloying element for stabilizing the capacity of deep-cycle lead-acid in the early stages of cycling.

EXAMPLE 3

Figure 5:
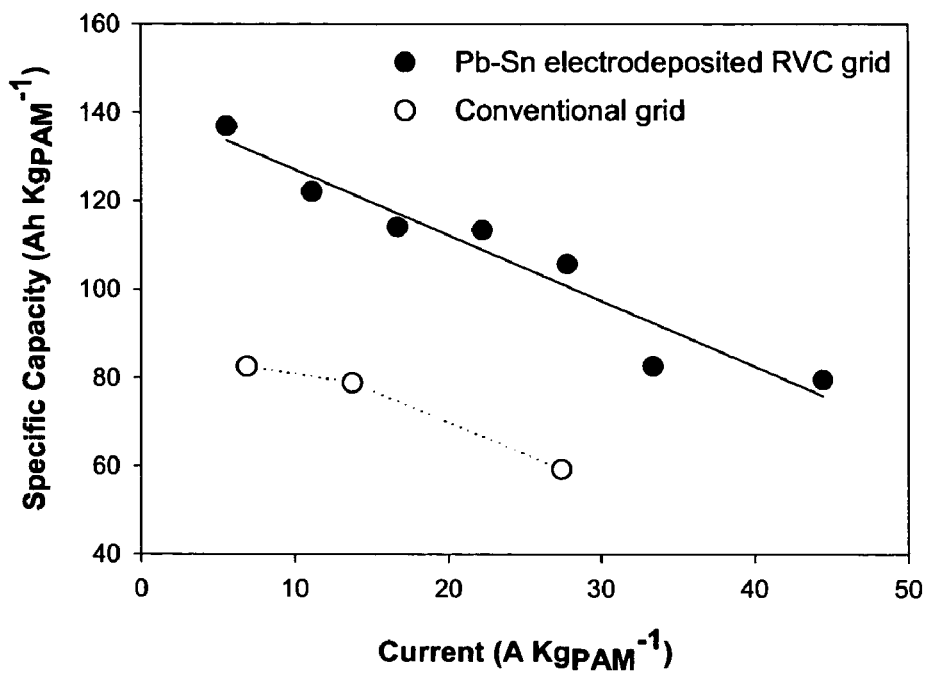
FIG. 5 compares the nominal specific capacity (Peukert diagram) for the limiting positive electrode for the lead-tin electroplated reticulated vitreous carbon manufactured according to the present invention and book-mould current collector designs.

Performance Comparison Between Batteries Employing Book-Mould Grids and Electroplated Reticulated Vitreous Carbon Current Collectors The comparative nominal capacities, Peukert diagram, for the performance limiting positive electrode in the case of two flooded single-cell 2 V batteries employing book-mould and lead-tin (1% by weight of tin) electrodeposited RVC collectors, respectively, is shown by FIG. 5. Both battery types were pasted, assembled and formed under identical conditions. The lead-tin electrodeposited reticulated grids were prepared according to the method described in Example 1 and Example 2. The employed discharge currents corresponded to discharge rates between 24 to 2 h for the positive limited electroplated RVC collector battery and 12 to 2 h for the book-mould grid battery, respectively (FIG. 5).

Discharging the two batteries at a current of 27.5 A/kg$_{PAM}$ the specific discharge capacity of the positive plate using the electrodeposited RVC collector was 105.7 Ah/kg$_{PAM}$ (utilization efficiency of 47.2%), whilst in the case of the book-mould collector only 59.3 Ah/Kg$_{PAM}$ was obtained indicating a low utilization efficiency of the positive active mass, i.e. 26.2% (FIG. 5). Therefore, the specific capacity of the positive plate with electroplated reticulated collector was 78% higher than the capacity of the plate that used an industry standard book-mould grid.

At a discharge current of 6 A/Kg$_{PAM}$ the specific capacity of the electroplated RVC positive plate was 66% higher than in the case of book-mould grid. The improvement of the positive active mass utilization efficiency and specific capacity of the limiting positive electrode is directly correlated with the enhancement of the specific energy of the battery. Based on the presented results the specific energy of a flooded lead-acid battery equipped with electroplated RVC collectors was 62.7 Wh/kg at a discharge rate of 20 hrs. Under similar conditions a battery equipped with book-mould collectors would provide only 39.1 Wh/kg. This clearly shows the significant performance improvement obtained by using lead-tin electroplated RVC current collectors in lead-acid batteries.

EXAMPLE 4

Cycle Life of a Flooded Lead-Acid Battery Equipped With Electroplated RVC Current Collectors A test cell composed of one positive and two negative pasted electroplated lead-tin RVC electrodes was subjected to long-term cycling. The electrodes were prepared by the method described in Example 1 and Example 2. Each cycle comprised of a discharge at 63 A/Kg$_{PAM}$ (nominal utilization efficiency 21% and 0.75 h rate) followed by a two-step constant current charge at 35 A/Kg$_{PAM}$ and 9.5 A/Kg$_{PAM}$, respectively, with a cut-off voltage at 2.6 V. The returning charge was 105–115% of previous discharge.

Figure 6:
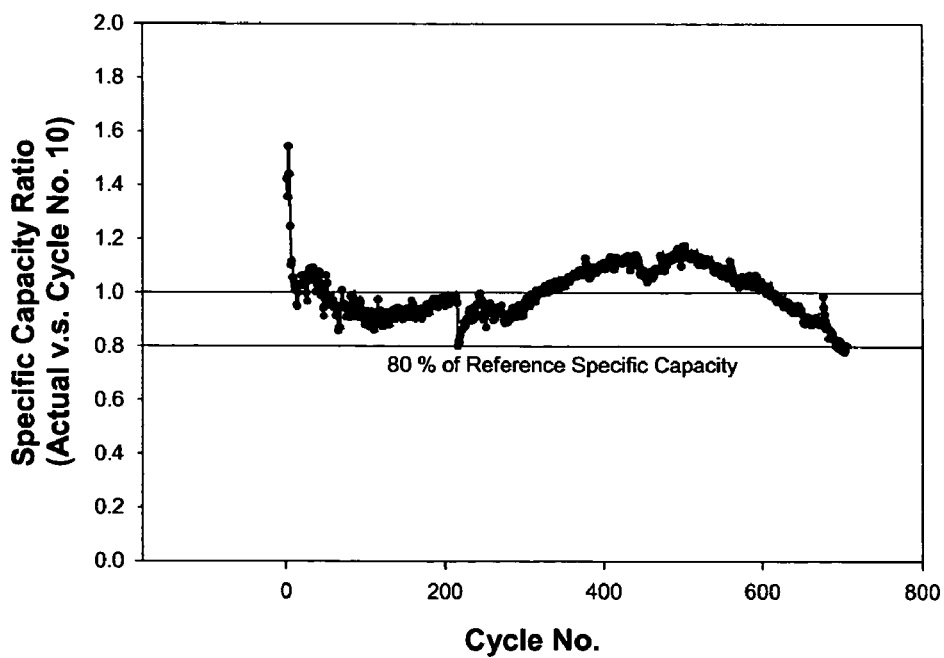
FIG. 6 shows the cycling performance with respect to the positive limiting electrode for a flooded single cell 2 volt battery equipped with lead-tin electroplated vitreous carbon current collectors manufactured according to the present invention.

FIG. 6 shows the cycling performance of the battery under the above conditions. Using the specific capacity of cycle 10 as a reference, the lead-tin (1% by weight tin) electrodeposited RVC battery completed 706 cycles above or at 80% of the reference specific capacity, corresponding to over 2100 h of continuous operation. The above experiment indicates therefore, that lead-tin electrodeposited RVC electrodes are capable of providing long battery cycle life.

EXAMPLE 5

Comparative Testing of 2 V Batteries Equipped with Reticulated Aluminum Collectors Plated with Lead-Tin Alloys of Various Composition In one embodiment of the present invention, metal reticulated foams such as aluminum with 20 pores per inch was used as substrate for grid manufacturing. The aluminum reticulated foam having dimensions of: 12.2 cm×15.2 cm×5.9 mm (height×width×thickness) was uniformly coated with a layer of lead-tin alloy using the method described in Example 1. It is understood to those skilled in the art that other lead coating methods can also be employed to produce lead deposited reticulated aluminum current collectors. Two negative and one positive lead electrodeposited aluminum collector was pasted and assembled to form a single cell flooded 2 V battery. For comparative testing purposes another single cell flooded battery was assembled and formed in an identical fashion but equipped with industry standard book-mould collectors. Table 2 compares the discharge current, the specific capacity of the positive limiting plate, and the utilization efficiency of the positive active mass (PAM utilization efficiency) in the case of the 20 h discharge rate.

TABLE 2

Comparison between book-mould and electroplated aluminum current collectors in flooded single cell 2 V batteries.

|  | Book-mould collector | Lead-tin electrodeposited reticulated aluminum |
|---|---|---|
| Discharge time (h) | 20 | 20 |
| Discharge current (A/kg$_{PAM}$) | 2.7 | 5.8 |
| Discharge capacity (Ah/kg$_{PAM}$) | 55.1 | 116.1 |
| PAM utilization efficiency (%) | 24.6 | 51.8 |

The PAM utilization efficiency and discharge capacity of the lead electrodeposited reticulated aluminum electrode was 42% higher than for the book-mould electrode. This example shows that high specific surface area reticulated metals can also serve as substrates for lead or lead-alloy deposited battery current collectors.

EXAMPLE 6

Single or Multi-Layer Open Pore Substrates

Other than reticulated substrates, which are open pore multi-layer substrates, the following non-limiting additional types of substrates can be considered. For example, single or multi-layer screen(s) coated with lead or lead-tin alloy could be considered. The difference in these two types of substrates is in the number of struts, which connect the pores, for example, typically three strut joints in reticulated versus typically four strut joints in screens. However, other number of strut joints can be anticipated by those skilled in the art for other geometries.

We claim:

1. A current collector for use in batteries, comprising:
   a reticulated carbon substrate having circuitous pores; and
   a layer of a lead-tin containing alloy applied to the reticulated carbon substrate.

2. The current collector according to claim 1, wherein the reticulated carbon substrate includes a reticulated vitreous carbon.

3. The current collector according to claim 2, wherein the vitreous carbon includes about 20 to 30 pores per inch.

4. The current collector according to claim 1, further comprising a frame attached to an outer edge of the reticulated carbon substrate.

5. The current collector according to claim 1, wherein the tin content of the alloy includes about 0.2% to 3% by weight of the alloy.

6. The current collector according to claim 1, wherein the tin content of the alloy includes about 0.5 % to 2 % by weight of the alloy.

7. The current collector according to claim 1, wherein the surface area of the reticulated carbon substrate includes about 500 to 20,000 square meters per cubic meter.

8. The current collector according to claim 1, wherein the thickness of the layer of the lead-tin containing alloy includes about 20 to 2,000 microns.

9. The current collector according to claim 1, wherein the reticulated carbon substrate comprises a conductive material.

10. An electrode for use in lead-acid batteries, comprising:
    a reticulated carbon substrate having circuitous pores;
    a layer of lead-tin alloy deposited on the substrate; and
    a layer of a lead-containing paste on the layer of the lead-tin alloy.

11. The current collector electrode according to claim 10, wherein the paste includes lead oxide.

12. The current collector electrode according to claim 10, wherein the paste includes lead sulfate and lead oxide.

13. The current collector electrode of claim 10, wherein the paste includes lead sulfate.

14. The electrode according to claim 10, wherein the reticulated carbon substrate includes vitreous carbon.

15. A battery, comprising:
    a housing;
    a pair of electrodes fixed within the housing, each of the electrodes having a reticulated carbon substrate with circuitous pores, a layer of a metal alloy applied to the substrate, and an active material applied to at least a portion of the metal alloy;
    an electrolyte contacting the electrodes and bridging the space between them; and
    terminal connections connected to the electrodes.

* * * * *